June 23, 1970  J. J. HICKEY ET AL  3,516,727
MULTIPASS INTERFEROMETRIC OPTICAL MODULATOR
Filed Oct. 20, 1966

INVENTORS
John J. Hickey
BY Arvind S. Marathay

Attorneys

United States Patent Office 3,516,727
Patented June 23, 1970

3,516,727
MULTIPASS INTERFEROMETRIC OPTICAL MODULATOR
John J. Hickey, Redwood City, and Arvind S. Marathay, Sunnyvale, Calif., assignors, by mesne assignments, to Technical Operations, Incorporated, Burlington, Mass., a corporation of Delaware
Filed Oct. 20, 1966, Ser. No. 588,131
Int. Cl. C02f 1/16, 1/34, 1/38
U.S. Cl. 350—160                                                                 11 Claims

ABSTRACT OF THE DISCLOSURE

This disclosure depicts a multi-crystal electro-optic modulator assembly comprising a parallel pair of single crystal transversely excited electro-optic modulators. An input laser beam is split and fed into the parallel crystals. The component beams are recombined at the output so as to interfere. Mirror means are provided for causing each of the component beams to traverse its respective crystal reiteratively from one end of the crystal to the other and back again to the point of entrance into the crystal.

---

The advent of the laser and its abundance of coherent radiation has resulted in a renewed interest in electro-optical modulators and, in particular, those using the Pockel effect in crystals. Crystals employed in modulators of the type relating to the present invention are well known in the art and are generally limited to those crystals which are cut in such a manner as to optimize the electro-optic effect and minimize other undesirable effects. Using crystals of this description, various schemes have been devised to produce optical modulators wherein most of the schemes are of two basic types; the polarization type and the interferometer type. The present invention is of the latter type wherein two mutually coherent separate light beams are subject to phase modulation before being combined to form an output beam. The intensity of the output beam is a function of the relative phase of the light beams when they are combined, such that by controlling the difference in path lengths between the two beams it is possible to cause the beams to combine in varying degrees of destructiveness to produce a modulated output beam.

A serious problem which exists in a modulator of the description set out generally above is the voltage required to produce a half-wave length shift between the two beams (100% modulation). Prior to the present invention voltage sources in the kilovolt range have been required to produce 100% modulation whereby the utilization of practical solid state electronics as a driving means for the modulator has not been possible.

Accordingly, it is an object of the present invention to provide an interferometric optical modulator which is characterized by a half-wave voltage (voltage necessary to produce 100% modulation whereby the utilization of the modulator has not been possible.

Accordingly, it is an object of the persent invention to provide an interferometric optical modulator which is characterized by a half-wave voltage (voltage necessary to produce 100% modulation) of approximately 20 volts.

A further object of the present invention is to provide an optical modulator wherein a beam of radiation is caused to make several passes through a single crystal whereby the optic effects of the crystal per volt across the crystal are greatly increased.

A further object of the present invention is to provide an optical modulator wherein a beam splitter is used to split a single beam into two beams which pass through separate crystals, and means are provided for creating a temperature gradient across the crystals so that the split beams may be maintained perfectly parallel at all times.

Further and more specific objects and advantages of the present invention are made apparent in the following specification wherein a preferred form of the invention is described by reference to the accompany drawings.

Figure 1:
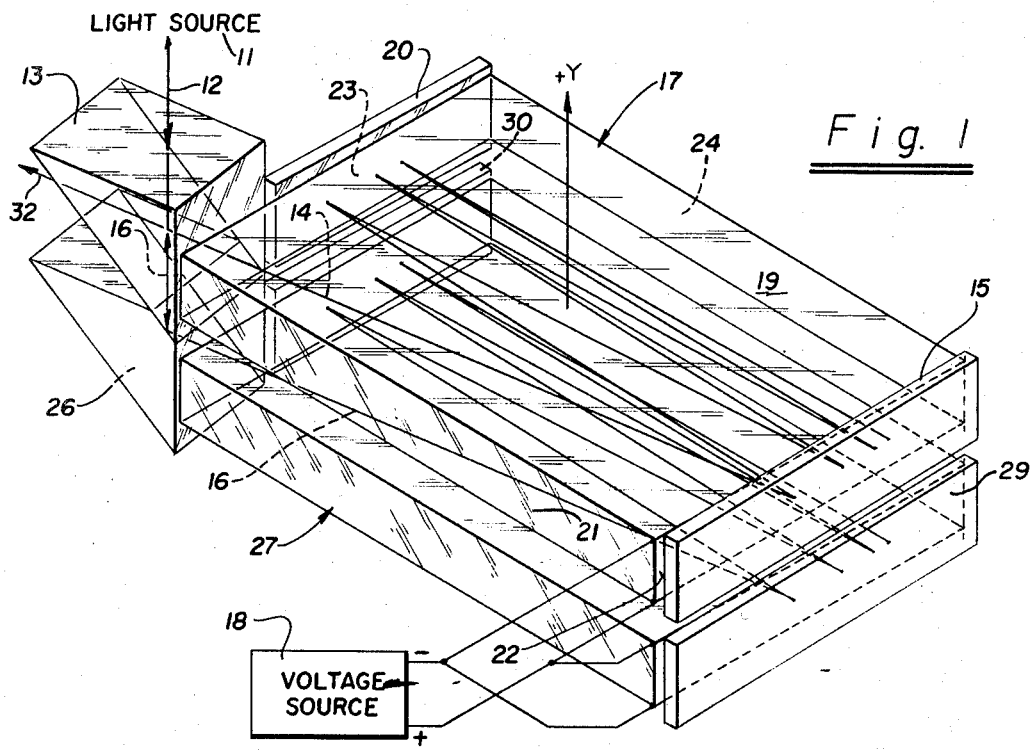
Figure 2:
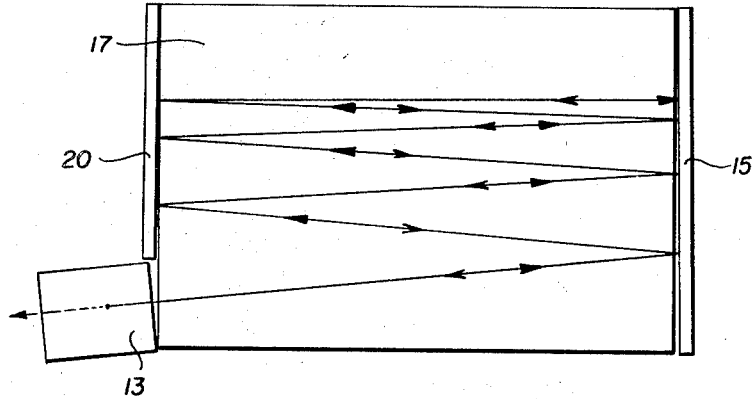
Figure 3:
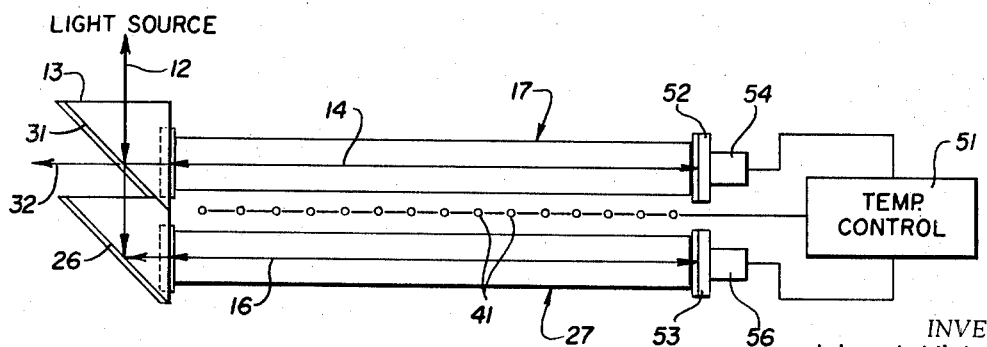

In the drawings:
FIG. 1 is an isometric illustration of the multi-pass interferometric optical modulator of the present invention with a voltage source shown schematically;
FIG. 2 is a plan view of the modulator of FIG. 1; and
FIG. 3 is a generally side view of the modulator of FIG. 1 with means for establishing a temperature gradient shown in schematic form.

Referring now to the drawings, a source of coherent radiation, such as a laser beam source 11, directs a single beam 12 to a beam splitter 13 which causes the beam to divide into a beam 14 and a beam 16. Beam 14 is directed into a crystal 17 having an eletcric field estabilshed across its transverse mode by virtue of a voltage source 18 being connected to its opposing upper and lower faces 19 and 21.

A mirror 15 is disposed adjacent end 22 of crystal 17 while a mirror 20 is disposed adjacent the end 23. The mirrors are oriented so as to converge in the direction of side surface 24 such that the beam 14 reaches a point after being reflected between the mirrors where it reverses its path until it finally emerges at the same point where it initially entered the crystal.

While an advantageous system is formed by using mirrors which are parallel rather than convergent, such a system only reflects the beam once across the crystal before the beam emerges. By using convergent mirrors the beam passes across the crystal twice (once away from its entrance point and once back toward its entrance point) which increases the effects on the beam by a factor of two. The convergent mirror arrangement also produces twice the number of reflections between the mirrors for a pass across the crystal (the distance between reflections diminishing prior to the beam changing direction), producing another factor of two increase in crystal effect on the beam. Thus the convergent arrangement of mirrors 15 and 20 gives better results by a factor of 4 than a parallel arrangement of the mirrors.

The other half 16 of beam 12 is reflected off of a mirrored surface 26 which is so disposed as to cause the beam 16 to enter a crystal 27 which is disposed parallel to the crystal 17. The angular relationship between the beam splitter 13 and mirror 26 is such that the beams 14 and 16 are parallel and the path followed by beam 16 within crystal 27 is identical to the path followed by beam 14 in crystal 17. It is necessary, of course, that the crystal 27 be substantially identical to the crystal 17 and have associated mirrors 29 and 30 in order that the paths of the beams entering the crystals be identical and of the same length. The crystal 27 is also connected to voltage source 18 such that an electric field is established in its transverse mode, but the connections are such as to cause the direction of the electrical field established in crystal 27 to be opposite, although equal, to the electrical field established in the transverse mode of crystal 17.

When the beam 16 in crystal 27 emerges from the crystal it is reflected by mirror 26 back to the half mirrored surface 31 of beam splitter 13 where a portion of it combines with a portion of the emerging beam 14 so as to produce an output beam 32. Since the intensity of beam 32 is a function of the phase relationship between beam 14 and beam 16 when they combine, the beam can be modulated by varying this phase relationship.

The voltage applied across the crystal 17 is capable of varying the refractive index of the crystal so that the number of wave lengths of radiation required to traverse the path from input to output of the crystals can also be varied. Thus, if the voltage source 18 were applied only across crystal 17, and if the beam 14 made only a single path through the crystal, the voltage source would have to produce sufficient change in crystal index to increase the number of wave lengths required to traverse the crystal by a half-wave length in order to produce 100% modulation. This is, in general, the practice of the prior art. In the present invention the fact that the beam 14 makes several passes through the crystal 17 reduces the half-wave voltage requirements of source 18 since the change in phase shift is a function of the index change times the path length.

By having a field of opposite polarity across crystal 27, a push-pull effect is achieved (increased voltage produces a positive index change in crystal 17 and a negative index change in crystal 27) further increasing the efficiency of the system. The crystals are oriented with their Y axis parallel and in the same direction, however, whereby temperature effects are perfectly compensated for and thus cancelled.

There are several possible reasons why the beams 14 and 16 may not be, in fact, parallel, including imperfections in the beam splitter, crystal imperfections, mirror curvature, etc. Since the proper operation of the invention is dependent on beams 14 and 16 being parallel (so that both beams see the same index of refraction), the present invention teaches the use of a heater means (see FIG. 3) shown generally at 41 disposed between the two crystals and operated by heater control means 51. Heater means 41 may be a coil carrying water or gas which is at a temperature which differs from the ambient temperature and thus establishes a temperature gradient along the Y axis of the crystals. There are, of course, numerous other systems including electrical coils which could produce a similar temperature gradient, and the invention is not to be limited by any specific device for producing this temperature gradient. By establishing the proper temperature gradient, the bending of the beams can be corrected so that they are, in fact, perfectly parallel.

To form an automatic system for maintaining the beams parallel, the present invention teaches the use of partially transmitting end mirrors 52 and 53 which are associated with photo detectors 54 and 56, respectively. The photo detectors are operatively connected to heater control means 51 and serve to provide signals when the beams are not parallel for operating the control means to establish the necessary temperature gradient to render the beams parallel.

What is claimed is:

1. In an interferometric optical modulator the combination comprising:
    means producing a beam of monochromatic coherent light;
    first beamsplitter means disposed to intercept the beam of light and split it into a first beam and a second beam;
    a first crystal having an electro-optic effect disposed to intercept said first beam;
    first mirror means associated with said first crystal and so oriented with respect thereto as to cause said first beam to pass through said first crystal a plurality of times before emerging from said crystal at an exit location;
    a second crystal having an electro-optic effect disposed to intercept said second beam;
    second mirror means associated with said second crystal and so oriented with respect thereto as to cause said second beam to pass through said second crystal a plurality of times before emerging therefrom at an exit location;
    beamsplitter means disposed to receive said first and said second beams as they emerge from the exit locations of their respective crystals and recombine them into a single beam; and
    electrical means establishing an electrical field across at least one of said crystals;
    said first and second mirror means including reflective surfaces adjacent opposing surfaces of said crystals, said opposing reflective surfaces being arranged convergingly such that the reflected beams are caused to reverse their direction.

2. In an interferometric optical modulator the combination comprising:
    means producing a beam of monochromatic coherent light;
    first beamsplitter means disposed to intercept the beam of light and split it into a first beam and a second beam;
    a first crystal having an electro-optic effect disposed to intercept said first beam;
    first mirror means associated with said first crystal and so oriented with respect thereto as to cause said first beam to pass through said first crystal a plurality of times before emerging from said crystal at an exit location;
    a second crystal having an electro-optic effect disposed to intercept said second beam;
    second mirror means associated with said second crystal and so oriented with respect thereto as to cause said second beam to pass through said second crystal a plurality of times before emerging therefrom at an exit location;
    second beamsplitter means disposed to receive said first and said second beams as they emerge from the exit locations of their respective crystals and recombine them into a single beam; and
    electrical means establishing an electrical field across at least one of said crystals;
    said first and second crystals being identical and disposed parallel to one another with corresponding crystal axes parallel to one another and in the same direction;
    said electrical means being operatively connected to both said first and second crystals in an orientation which establishes electrical fields of opposite polarity across said crystals.

3. The interferometric optical modulator of claim 2 wherein said first and second beams are directed into said crystals so as to travel in the transverse mode thereof and each of said first and second mirror means comprises;
    reflective surfaces in spaced facing relationship disposed adjacent the opposing edges of one of said crystals, said surfaces being non-parallel so as to converge and cause the beam to reverse its travel in the crystal whereby the beam passes twice across the crystal in the direction generally parallel to the reflective surfaces.

4. The interferometric crystal modulator of claim 2 further comprising;
    heat exchanger means disposed between said crystals and operative to establish a temperature gradient along the Y axis of said crystals to maintain said first and second beams parallel.

5. An electro-optic modulator for modulating a beam of coherent quasi-monochromatic optical frequency radiation, comprising:
    a medium exhibiting a field-dependent anisotropy;
    guide means defining a path for said beam through said medium; and
    electrode means for applying a varying electric field across said medium transverse to the light path through said medium to effect a phase modulation of at least a component of said beam;
    said guide means including reflective means contiguous with opposite boundaries of said medium for establishing a zigzag light path through said medium to increase the optical light path length of the beam in said medium, said reflective means being effective to return the beam back along said zigzag path.

6. The apparatus defined by claim 5 wherein said reflective means comprises a pair of planar mirrors located in intersecting planes, and wherein said guide means includes means for directing said beam to impinge on one of said mirrors off-normal.

7. An electro-optic modulator comprising:

beamsplitting means for separating a beam of coherent quasi-monochromatic optical frequency radiation into two spatially displaced components;

first and second media, at least one of which exhibits a field-dependent anisotropy;

reflective means contiguous with opposite boundaries of each of said first and second media for defining first and second reiterative light paths for said beam components through said first and second media, respectively;

electrode means for applying respective electric fields transversely across at least said field-dependent medium to effect a phase modulation of at least a component of at least one of said beam components; and means for reuniting said beam components with modulated components thereof in the same plane of polarization;

said reflective means being effective to return said respective beam components back along said reiterative light paths.

8. The apparatus defined by claim 7 wherein said beam splitting means and said means for reuniting said beam components are constituted by the same optical structure and are effective to cause the intensity of the composite beam to be dependent upon the phase relationship of the separate beams.

9. The apparatus defined by claim 8 wherein said beam splitting-recombining means comprise first and second spaced, parallel, coaxial, reflective surfaces angled with respect to said beam of optical frequency radiation, said first surface being semi-reflective and said second surface being totally reflective.

10. The apparatus defined by claim 7 wherein said electrode means are positioned to apply electric fields across said first and second media of opposite polarity relative to corresponding crystal orientations.

11. The apparatus defined by claim 7 including thermal means in heat exchange relationship with at least one of said crystals for impressing a temperature gradient across said crystal to maintain said beam components in parallelism.

References Cited

UNITED STATES PATENTS

| | | | |
|---|---|---|---|
| 3,243,722 | 3/1966 | Billings | 331—94.5 |
| 3,317,266 | 5/1967 | Heller et al. | 350—160 |
| 3,325,646 | 6/1967 | Reichel et al. | 250—199 |

RONALD L. WIBERT, Primary Examiner

P. K. GODWIN, Jr., Assistant Examiner

U.S. Cl. X.R.

332—7.51, 48; 350—163, 299

PO-1050
(5/69)

UNITED STATES PATENT OFFICE
CERTIFICATE OF CORRECTION

Patent No. 3,516,727　　　　　　　　　　Dated　June 23, 1970

Inventor(s)　John J. Hickey and Arvind S. Marathay

It is certified that error appears in the above-identified patent and that said Letters Patent are hereby corrected as shown below:

Column 1, delete lines 54-58 inclusive.

SIGNED AND
SEALED
OCT 20 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,516,727        Dated June 23, 1970

Inventor(s) John J. Hickey and Arvind S. Marathay

It is certified that error appears in the above-identified patent and that said Letters Patent are hereby corrected as shown below:

Column 1, delete lines 54-58 inclusive.

SIGNED AND
SEALED
OCT 20 1970

(SEAL)
Attest:

Edward M. Fletcher, Jr.
Attesting Officer

WILLIAM E. SCHUYLER, JR.
Commissioner of Patents